United States Patent
Jørgensen

(10) Patent No.: US 8,757,809 B2
(45) Date of Patent: *Jun. 24, 2014

(54) COLOR COMBINING ILLUMINATION DEVICE

(75) Inventor: Dennis Thykjær Jørgensen, Rønde (DK)

(73) Assignee: Martin Professional A/S, Aarhus N. (DK)

(*) Notice: Subject to any disclaimer, the term of this patent is extended or adjusted under 35 U.S.C. 154(b) by 84 days.

This patent is subject to a terminal disclaimer.

(21) Appl. No.: 13/383,733

(22) PCT Filed: Jul. 5, 2010

(86) PCT No.: PCT/DK2010/050175
§ 371 (c)(1),
(2), (4) Date: Mar. 1, 2012

(87) PCT Pub. No.: WO2011/006503
PCT Pub. Date: Jan. 20, 2011

(65) Prior Publication Data
US 2012/0147333 A1  Jun. 14, 2012

Related U.S. Application Data

(63) Continuation-in-part of application No. PCT/DK2010/050086, filed on Apr. 19, 2010.

(30) Foreign Application Priority Data

Jul. 13, 2009  (DK) .................................. 2009 00860

(51) Int. Cl.
*G03B 21/00* (2006.01)

(52) U.S. Cl.
USPC ............... 353/31; 353/30; 353/37; 353/85; 353/98; 353/99; 362/227; 362/241

(58) Field of Classification Search
USPC ......... 353/30, 31, 33, 34, 37, 85, 98, 99, 100, 353/119; 349/5, 7–9, 25, 29–30; 362/227, 362/241, 247, 294, 545, 551, 555, 362/560–561; 348/742, 743, 744–747, 752, 348/E9.027

See application file for complete search history.

(56) References Cited

U.S. PATENT DOCUMENTS 7,239,449 B2  7/2007  Leitel et al.
7,905,605 B2  3/2011  Bierhuizen et al.
(Continued)

FOREIGN PATENT DOCUMENTS

CN  1095289  11/1994
CN  1595225 A  3/2005
(Continued)

OTHER PUBLICATIONS

Chinese Search Report; Application No. 2010800301808; Filing Date: Jul. 5, 2010; 2 pages.

(Continued)

Primary Examiner — Sultan Chowdhury
(74) Attorney, Agent, or Firm — Blank Rome LLP

(57) ABSTRACT

An illumination device comprising a first light source generating first light beam having a first spectral distribution and a second light source generating a second light beam having a second spectral distribution. A first dichroic reflector is positioned in the first light beam and transmits a part of the first light beam and reflects a part of the second light beam. The first and second light beam propagates initially primarily in a first direction along an optical axis and reflecting means reflects the second light beam towards the dichroic reflector. The light sources, the dichroic reflector and reflecting means are mutually arranged such that the second light beam propagates primarily in a second direction substantially opposite the first direction and towards the first light source after being reflected by the reflecting means and such that the second light beam propagates substantial in the first direction after being reflected by the dichroic reflector.

18 Claims, 12 Drawing Sheets

(56) References Cited

U.S. PATENT DOCUMENTS

2002/0030812 A1 3/2002 Ortyn et al.
2007/0103646 A1 5/2007 Young

FOREIGN PATENT DOCUMENTS

| | | | |
|---|---|---|---|
| CN | 101583903 A | | 11/2009 |
| JP | 2006-139044 | | 6/2006 |
| WO | WO2008/072197 | | 6/2000 |
| WO | WO2006/054969 | | 5/2006 |
| WO | WO2006054969 | A2 | 5/2006 |
| WO | WO2011006501 | | 1/2011 |

OTHER PUBLICATIONS

English Translation of Chinese Search Report; Application No. 2010800301808; Filing Date: Jul. 5, 2010; 1 page.
Chinese First Office Action; Application No. 2010800301808; Filing Date: Jul. 5, 2010; 4 pages.
English Translation of Chinese First Office Action; Application No. 2010800301808; Filing Date: Jul. 5, 2010; 4 pages.
International Application No. PCT/DK2010/050175; International Search Report, mailed Sep. 30, 2010, 8 pages.
International Application No. PCT/DK2010/050175; International Written Opinion, mailed Sep. 30, 2010, 10 pages.
International Application No. PCT/DK2010/050086; International Search Report, mailed Sep. 30, 2010, 8 pages.
International Application No. PCT/DK2010/050086; International Written Opinion, mailed Sep. 30, 2010, 10 pages.
Danish Patent Application No. PA 2009 00860; Office Action, issued Feb. 24, 2010, 3 pages.
Danish Patent Application No. PA 2009 00860; Search Report, issued Feb. 24, 2010, 2 pages.
English translation; Chinese Office Action dated May 30, 2013; Chinese Application No. 2010800311890; 2 pages.
English translation; Chinese Search Report; Chinese Application No. 2010800311890; Dated May 30, 2013; 5 pages.
Chinese Office Action dated May 30, 2013; Chinese Application No. 2010800311890; 5 pages.
Extended European Search Report dated Feb. 17, 2014 issued for the corresponding European Application; European Application No. 10799453.5; 8 pages.

COLOR COMBINING ILLUMINATION DEVICE

FIELD OF THE INVENTION

The present invention relates to illumination devices for combining light from different light sources generating light beams of different colors into one light beam. The present invention also relates to display devices and moving heads comprising such illumination device.

BACKGROUND OF THE INVENTION

Optical systems, such as profile lamps or projectors, are limited in output by Etendue E=A*Ω, as the gate has a limited opening area A and the imaging optics only collects light from a limited solid angle Ω. For light sources the Etendue can be calculated in the same way, where A is the radiating area, and Ω is the solid angle it radiates into.

It is fundamentally only possible to effectively utilize light sources of same or less Etendue as the imaging optics in this kind of optical systems. So if the source Etendue is a close match to the Etendue of the imaging system there are no gains in using multiple sources in order to increase the light output (intensity/lumen) as the Etendue of the light sources then will be larger than the Etendue of imaging system and the imaging system is thus not cable of collecting the light.

However there is an exception to this when the sources are of different colors with spectral compositions with only a little overlap in spectrum. Then it will be possible to combine the different sources (colors) by an arrangement of appropriate designed dichroic band pass/band stop (reflecting) filters. This is a well known principle from LCD projectors, where "color cubes" are used to combine red, green and blue into white, such color cube system is illustrated in FIG. 1b. For an illumination system red green and blue can also be combined by use of sheets of dichroic reflectors/filters, such as the illumination systems illustrated in illustrated in FIGS. 1a, 1c and 1d.

One disadvantage of these known color combiner solutions is the inability to combine sources with overlapping spectrums efficiently. For LED's white phosphor converted LED's have the highest efficacy and are therefore crucial for an efficient color mixing luminare. Further the broad spectrum of phosphor converted white and amber LED's can help improve the Color rendering index compared to simple RGB LED solutions.

Another disadvantage of the known color combiners are the complexity of production due to three planes of sources and angled combiner filters which requires a lot of space.

U.S. Pat. No. 7,239,449 discloses an illumination module for color display, preferably for use in data or video projectors as well as rear projection television sets, in which the light from at least three luminescent diodes (LEDs) or LED arrays of the base colors red, green and blue is collimated at a point provided for connection to a display unit and ranged on an optical axis of the illumination module. An LED or an LED array of a base color with a beam path (Lr) oriented in the direction of the display unit is arranged on the optical axis of the illumination module. For the purpose of color mixing, the LEDs and LED arrays of the other base colors are attached in such a way that their beam paths (Lg, Lb) are laterally input in sequence under input angles (alpha, beta) of 90<degrees into the beam path (Lr) of the first base color.

WO2008/072197 discloses for instance a color cube system similar to the one illustrated in FIG. 1b. EP0985952 discloses an example of the liquid crystal projector using a color cube system similar to the one illustrated in FIG. 1b and where light form two of the light sources are reflected 90 degrees different light sources are reflected 90 degrees by a mirror before entering the color cube. JP2006-139044 discloses both a color cube system similar to the one illustrated in FIG. 1b and a color combining system using successive single sheets of dichroic reflectors/filters similar to systems illustrated in FIG. 1a and 1c. WO2006/054969 illustrates a moving head light fixture based on a color cube system like the one illustrated in FIG. 1b and another moving head light fixture based on successive single sheets of dichroic reflectors/filters similar to systems illustrated in FIGS. 1a and 1c.

DESCRIPTION OF THE INVENTION

The object of the present invention is to solve the above described problems. This can be achieved by invention as defined by the independent claims and the benefits and advantages of the present invention are disclosed in the detailed description of the drawings illustrating the invention.

DETAILED DESCRIPTION OF THE DRAWINGS

Figure 1A:
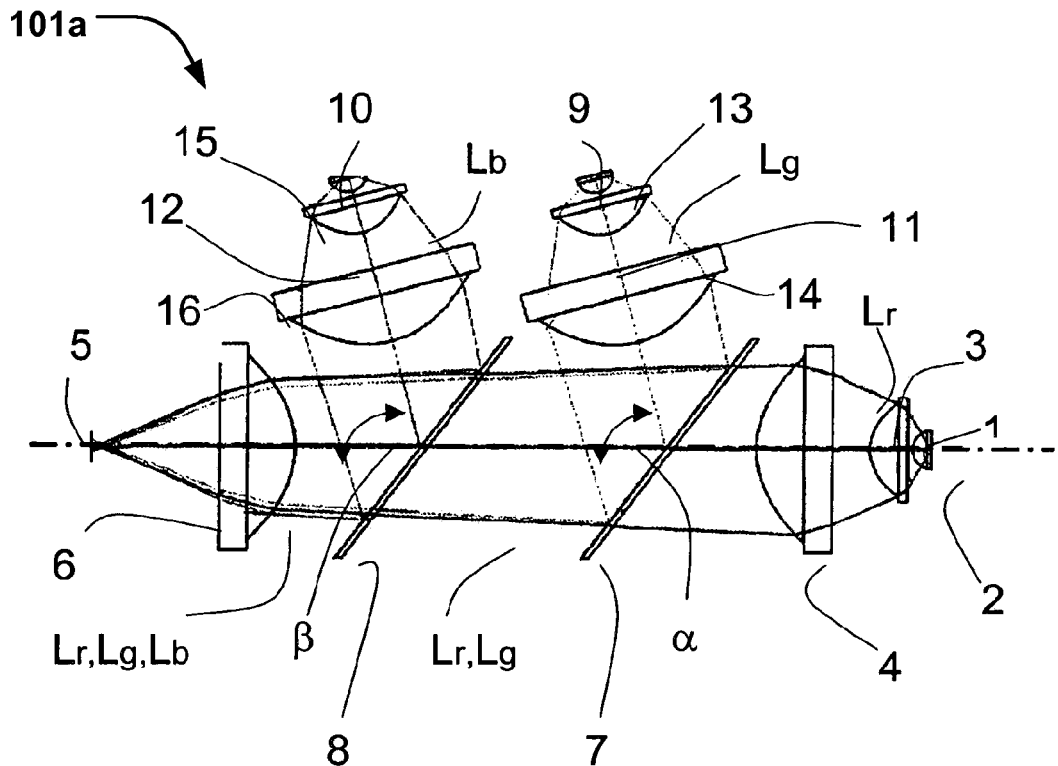
FIG. 1a-1d illustrate prior art color combining systems.

FIG. 1a illustrates the prior art color combining system 101a disclosed by U.S. Pat. No. 7,239,449 and shows a red LED 1, whose optical axis lies on the optical axis 2 of the illumination module, wherein the light beams Lr are collimated through convergent lenses 3 and 4. For the purpose of focusing the light beams Lr onto the light entry surfaces 5 of a light-mixing rod, which is not depicted in detail, an additional convergent lens 6 is located in the beam path. The convergent lenses 3, 4 and 6 are broadband lumenized plastic lenses, which each have at least one aspheric surface and are arranged on the optical axis 2 in such a way that the aspheric surfaces of the convergent lenses 3 and 4 are oriented toward the light entry surface 5 and the aspheric surface of the convergent lens 6 is oriented toward the LED 1.

For the purpose of laterally inputting the colors green and blue on the optical axis 2, two dichroic filters 7 and 8 and arranged between the convergent lenses 4 and 6, wherein the dichroic filter 7 is arranged in such a way that it inputs the light beams Lg emitted by a green LED 9 into the red beam path Lr. In this connection, the dichroic filter 8 assumes the function of inputting the light beams Lb emitted by a blue LED 10 into the already mixed beam path comprising the red light beams Lr and the green light beams Lg.

The optical axis 11 of the green LED 9 and the optical axis 12 of the blue LED 10 are placed at angles of incidence alpha and beta relative to the optical axis of the red LED 1 and/or relative to the optical axis 2 of the illumination module, wherein alpha and beta each are 75 degrees.

The light beams Lg collimated by the green LED, impinge upon the dichroic filter 7 through the convergent lenses 13 and 14, and are input into the light beams Lr, which are completely transmitted by the dichroic filter 7. In analogy to the inputting of the light beams Lg, the light beams Lb emitted by the blue LED 10, impinge upon the dichroic filter 8 through the convergent lenses 15 and 16 and, together with the already combined light beams Lr and Lg, are deflected into the light entry surface 5. As already mentioned, the mixed light beams Lr, Lg and Lb are focused into the light entry surface 5 of a light-mixing rod by means of the convergent lens 6.

The dichroic filters 7 and 8 have anti-reflective coated rear surfaces, thus allowing the light beams Lr to be completely transmitted by the dichroic filter 7 and the light beams Lr and Lg to be completely transmitted by the dichroic filter 8. Because the inputting of the light beams Lg and Lb is to take place with virtually no loss of light, the dichroic filters 7 and 8 are provided with special thin-layer systems, which act as long-pass filters.

Figure 1B:
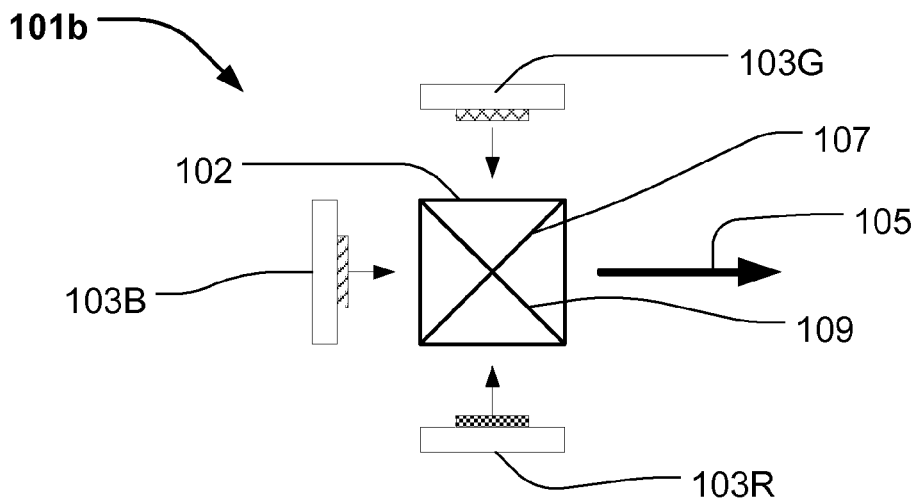

FIG. 1b illustrates prior art color combining system 101b comprising a color cube 102. The color cube are used to combine light from a red light source 103R, a green light source 103G and a blue light source 103B into a white light beam 105. The color cube comprises 102 comprises a "red" dichroic reflector 107 adapted to reflects red light and transmit other colors and a "green" dichroic reflector 109 adapted to reflects green light and transmit other colors. The red and green light will thus be reflected by the red dichroic reflector and green dichroic reflector respectively whereas the blue light will pass directly through the color cube. The consequence is an output light beam which appears white due the rules of additive color mixing.

Figure 1C:
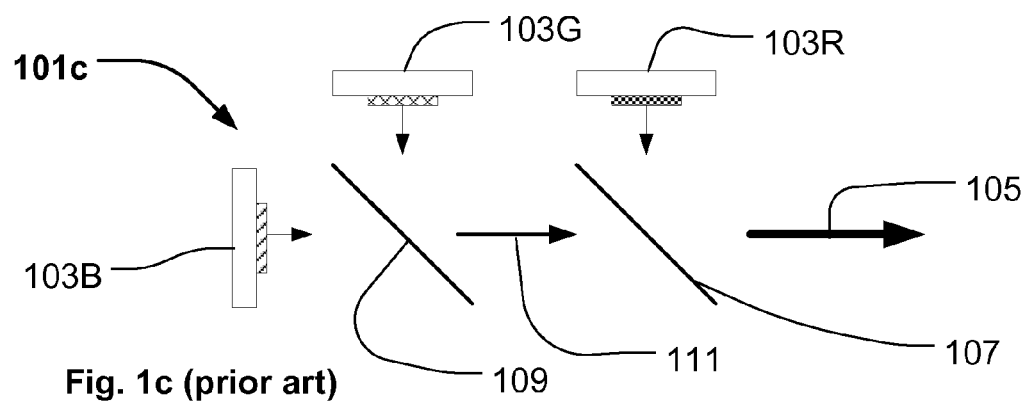
Figure 1D:
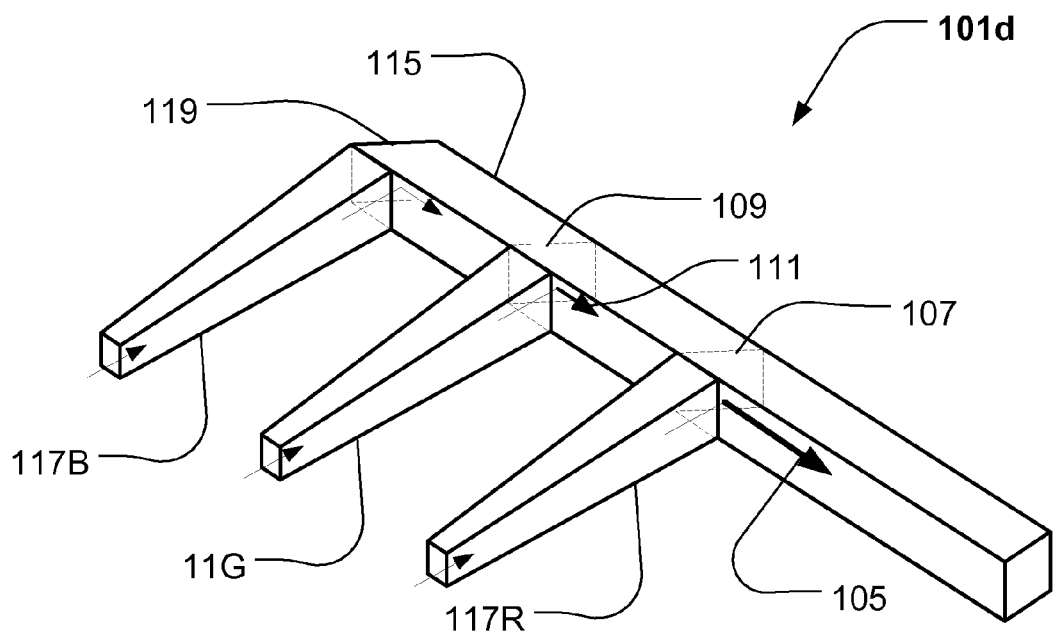

FIG. 1c illustrated a color combining system 101c where light from red 103R, blue 103B and green 103G light sources are combined into one light beam 105. The colors are added together successively instead of using as color cube as illustrated in FIG. 1b. Firstly; the blue and green light are combined into a turquoise beam 111 using a green dichroic reflector similar as described in FIG. 1a. Secondly; the turquoise beam 111 and red light are combined into a white light beam 105 using a red dichroic reflector similar as described in FIG. 1a. FIG. 1d illustrates a possible embodiment of the color combining system 101d of FIG. 1c. The color combining system is constructed of a main light pipe 115, a blue light pipe 117B, a green light pipe 117G and a red light pipe 117R. The light from the blue light source (not shown) is led into the blue light pipe 117B and coupled into the main light pipe 115 using a mirror 119. The light from the green light source (not shown) is led into the green light pipe 117G and coupled into the main light pipe 115 using a green dichroic reflector 109 positioned inside the main light pipe 115. Finally the light from the red light source (not shown) is led into the red light pipe 117R and coupled into the main light pipe 115 using a red dichroic reflector 107 positioned inside the main light pipe 115. The light travels inside the light pipes due to internal reflection.

One major disadvantages of the prior art color combining systems are the fact that the combined white light beam appears white, but comprises only of red, green and blue spectral components and the color rendering of the out coming light beam is thus very bad. Further prior art color combining systems need at least two dichroic reflectors which increases the cost of the color combining systems and further complicates the manufacturing process as both dichroic reflectors need to be positioned precisely and accurately in the optical system. Prior art color combining systems also uses 3 sources or source arrays at different positions and orientations adding complexity and cost to the constructions. The dichroic reflector need further to be angled with respect to the optical axis and the light beams of the colors the need to be coupled into the first light beam at very accurate angles in order to align the three light beams properly.

FIG. 2a-2f illustrates simplified embodiments of the illumination device 201a-201f according to the present invention, where the illumination device 201a-f in all figures comprises a first light source 203, a second light source 205, a first dichroic reflector 207 and reflecting means 209. The light from the light sources are in the illustrated embodiments let though an aperture/optical gate 210, First light source 203 generates in FIG. 2a a first light beam 211B having a first spectral distribution. The spectacle distribution of the first light beam is in the illustrated embodiment primarily distributed within the blue wavelengths and does thus appear blue for a person. The first light source is thus labeled with a B. The first light beam 211B propagates primarily in a first direction along an optical axis 213 as indicated by arrow 212; meaning that the vector of propagation of the first light beam 211B has at least one component which is parallel with the optical axis and that the vector component which is parallel with the optical axis is larger than the vector components (there are 2 others vectors in 3D) perpendicular to the optical axis. The angle between the first light beam 211B and the optical axes 213 is in most embodiments smaller than 33 degrees, as in most embodiments the cone of light from source 203 including secondary optics will cover an angle less than ±33 around the optical axis seen from the center of the gate. This provides a compact illumination device and makes it further possible to position a projecting system (not shown) which can collect most of the light along the optical axes. The first light beam propagating primarily in a first direction along the optical axis will in these embodiments have an angle smaller than 33 degrees in relation to the optical axes. The first light source 203 is in the illustrated embodiment positioned at and/or near the optical axes and the first light beam 211B propagates primarily in the first direction at and/or near the optical axis.

Figure 2A:
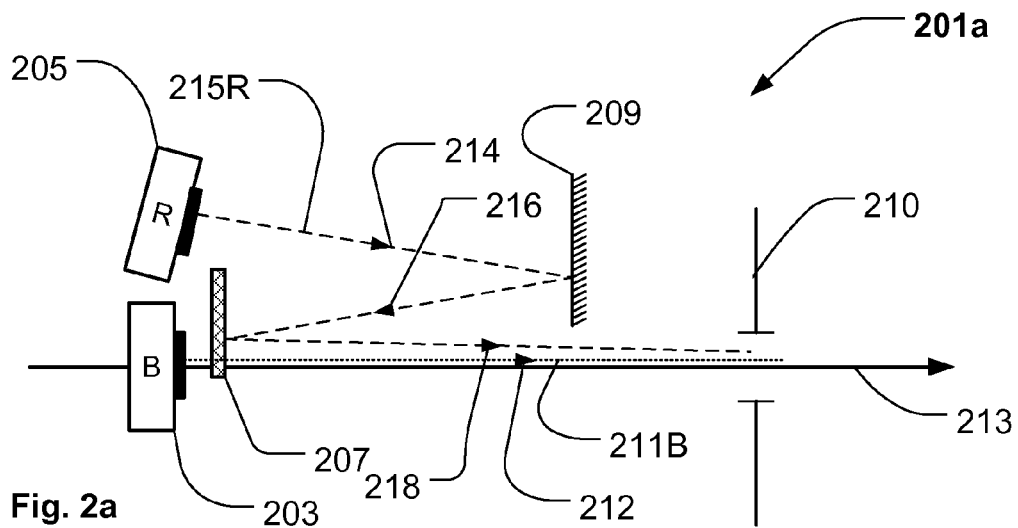
FIG. 2a-2f illustrate simplified embodiments of the illumination device according to the present invention.

The second light source 205 generates in FIG. 2a a second light beam 215R having a second spectral distribution. The spectacle distribution of the second light beam is in the illustrated embodiment different from the first light beam and primarily distributed within the red wavelengths. The second light source is thus labeled with a R. The second light beam 215R propagates primarily in the first direction along an optical axis 213 direction as indicated by arrow 214; meaning that the vector of propagation of the first light beam 215R has at least one component which is parallel with the optical axis and that the vector component which is parallel with the optical axis is larger than the vector (components there are 2 others vectors in 3D) perpendicular to the optical axis. In most embodiments the angle between the second light beam 215R and the optical axes 213 is smaller than 33 degrees as this provides a compact illumination device and makes it further possible to position a projecting system (not shown) which can collect most of the light along the optical axes. The second light beam propagating primarily in a first direction along the optical axis will in these embodiments have an angle smaller than 33 degrees in relation to the optical axes. The second light source 205 is in the illustrated embodiment positioned offset the optical axes and the second light beam 215R propagates primarily in the first direction offset the optical axes.

The second light beam 215R hits/impinges the reflecting means 209 and the reflecting means 209 reflects at least a part of said second light beam towards the first dichroic reflector 207. The first light source 203, the reflecting means 209, the second light source 205 and the first dichroic reflector 207 are mutual arranged such that the at least a part of the second light beam propagates primarily in a second direction substantially opposite said first direction as indicated by arrow 216 and towards at least a part of the first light source 203 after being reflected by the reflecting means 209. Meaning that the vector of propagation of the second light beam 215R has at least one component which is parallel with the optical axis and has an opposite sign compared to the similar component of the first light beam 205B. The vector component which is parallel with the optical axis is larger than the vector components perpendicular to the optical axis meaning that the red light beam 215R primarily travels along the optical axis but in negative (or opposite) direction. The angle between the second light beam and the optical axes is in most embodiments smaller than 33 degrees as the case with the first light beam but the second light beam propagates in the opposite direction along the optical axes. The second light beam propagating primarily in a second direction along the optical axis will in these embodiments have an angle smaller than 33 degrees in relation to the optical axes. The second light source 205 and the reflecting means 209 is in the illustrated embodiment positioned offset the optical axes and the second light beam 215R propagates primarily in the second direction offset the optical axes.

The first dichroic reflector 207 is at least partially positioned in both the first light beam 205B and the second light beam 215R. The first dichroic reflector 207 is adapted to transmit at least a part of the first light beam 205B and to reflect at least a part of the second light beam 215B. The first dichroic reflector is positioned such that the part of the second light beam 215R which is reflected by the reflecting means 209 hits/impinges the first dichroic reflector 207 before it would hit the first light source 203. The second light beam will thus be reflected by the first dichroic reflector 207 and propagate primarily in said first direction after being reflected by the first dichroic reflector 207 as indicated by arrow 218. The second light source 205, the reflecting means 209 and the first dichroic reflector 207 are arranged such that the second light beam 215R propagates primarily in the first direction at and/or near the optical axes. The first 211B and second 215R light beam are in this way combined and propagates together in the first direction at and/or near the optical axes.

The second light beam will in contrast to the prior art described above propagate parallel to and in the same direction as the first light beam, be reflected directly towards the first light source by the reflecting means, and propagate primarily in the first direction after being reflected by the dichroic reflector. The second light source and the first light source can thus be positioned in approximately the same plane and a very compact illumination device can thus be provided, as the light sources do not take up space along the optical axes where space in most applications is limited. In the case where an additional light source having another spectra distributions need to be added, the light from the first light source does not need to be reflected by or pass a third dichroic reflector with loss of intensity as the case in prior art. FIG. 2c-2f illustrates different embodiments of this.

The illumination device 201b-f in FIG. 2b-2f comprises further a third light source 219 generating a third light beam 221G having a third spectral distribution. The spectacle distribution of the third light beam is in the illustrated embodiment different from the first light beam 211B and the second light beam 215R and primarily distributed within the green wavelengths. The third light source is thus through FIG. 2b-2f labeled with a G. The third light beam 221G propagates primarily in the first direction along the optical axis 213 as indicated by arrow 222.

Figure 2B:
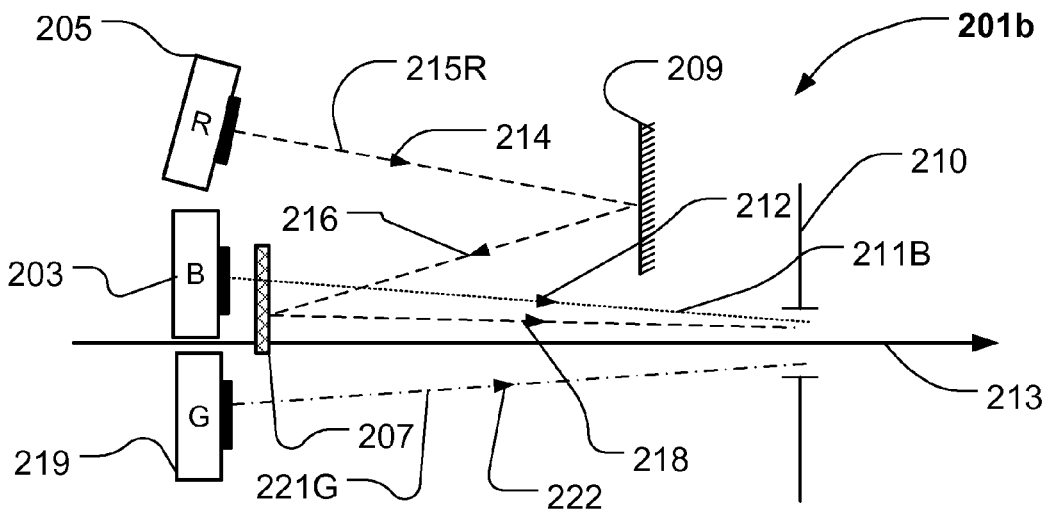
Figure 2C:
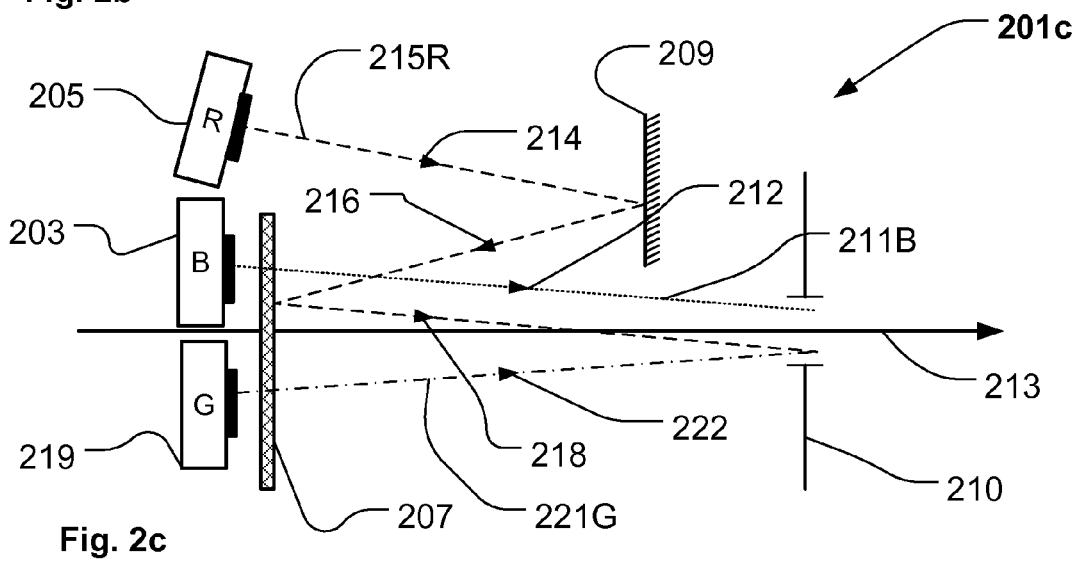

In FIG. 2b the third light beam 221G propagates primarily in the first direction near and/or at the optical axis and does not hit the first dichroic reflector 207 or the reflecting means 209. Whereas in FIG. 2c the third light beam 221G is transmitted through the first dichroic reflector 207, as the first dichroic filter also is positioned at least partially in the third light beam, the first light beam 211B and the second light beam 215B. The first dichroic reflector is thus also adapted transmit at least a part of the third light beam 221G. The first dichroic reflector 207 of FIG. 2c is thus adapted to transmit both the first light beam 211B and the third light beam 221G and to reflect the second light beam 215R. In FIG. 2c the first dichroic reflector is embodied as a low-pass filter (with respect to wavelength) with a cut off wavelength (approximately 595 nm) between the green and red wavelengths and will reflect wavelengths longer than the cut off wavelength (red light >595 nm) and transmit shorter wavelengths (blue and green light <595 nm). The skilled person realize that the same effect can be achieved by providing a second dichroic reflector besides the first dichroic reflector. The second dichroic reflector is in this case adapted to transmit the third light beam 221G and reflect the second light beam 215R. IT is thus possible to position the first and third light sources very close and let the second light beam 215R be back reflected towards both the first and third light source, whereby a very compact illumination device can be provided.

Figure 2D:
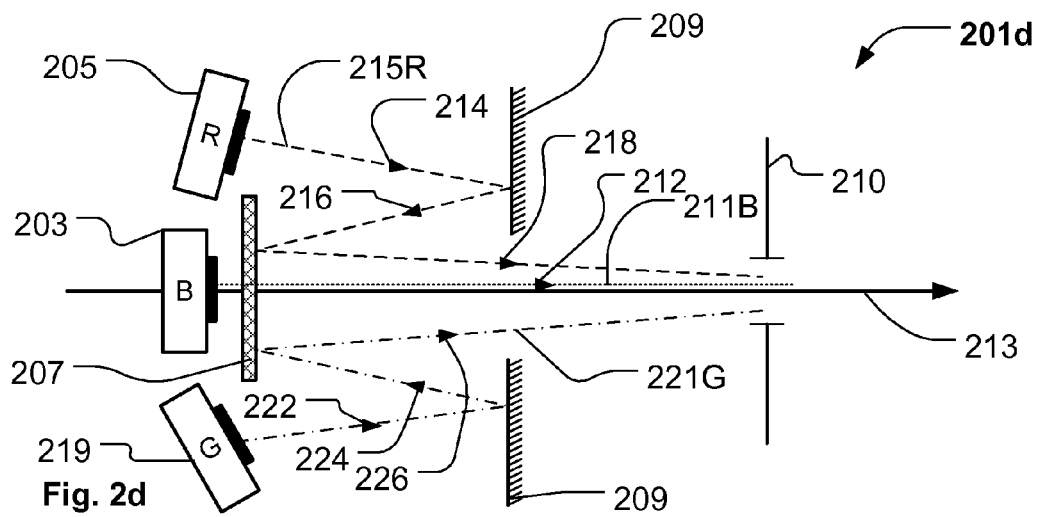
Figure 2E:
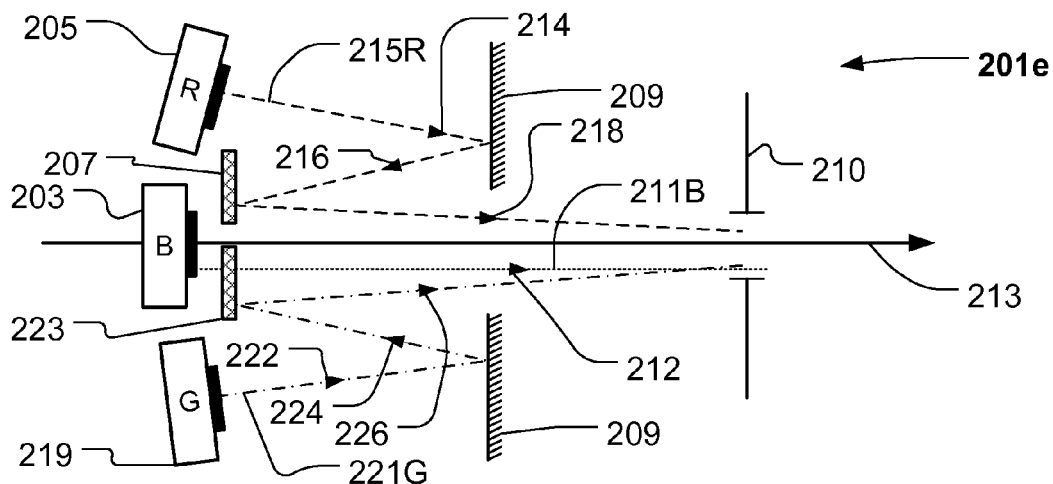

The third light source 219 is in FIGS. 2d and 2e positioned offset the optical axes and the third light beam 221G will like the second light beam 215R propagates primarily in the first direction offset the optical axes as illustrated by arrow 222, be reflected by the reflecting means 209, thereafter propagates primarily in the second direction offset the optical axes as illustrated by arrow 224, be reflected by the first dichroic reflector 207, and thereafter propagates primarily in the second direction offset the optical axes as illustrated by arrow 226. The first dichroic reflector is in FIG. 2d also adapted to reflect at least a part of the third light beam 221G. Whereas the illumination device in FIG. 2e comprises a second dichroic reflector 223 adapted to reflect at least a part of the third light beam 221G and to transmit at least a part of the first light beam 205B. In FIG. 2d the first dichroic reflector is embodied as a low-pass filter (with respect to wavelength) with a cut off wavelength (approximately 495 nm) between the green and blue wavelengths and will reflect wavelengths longer than the cut off wavelength (green and red light >495 nm) and transmit shorter wavelengths (blue light <495 nm).

Figure 2F:
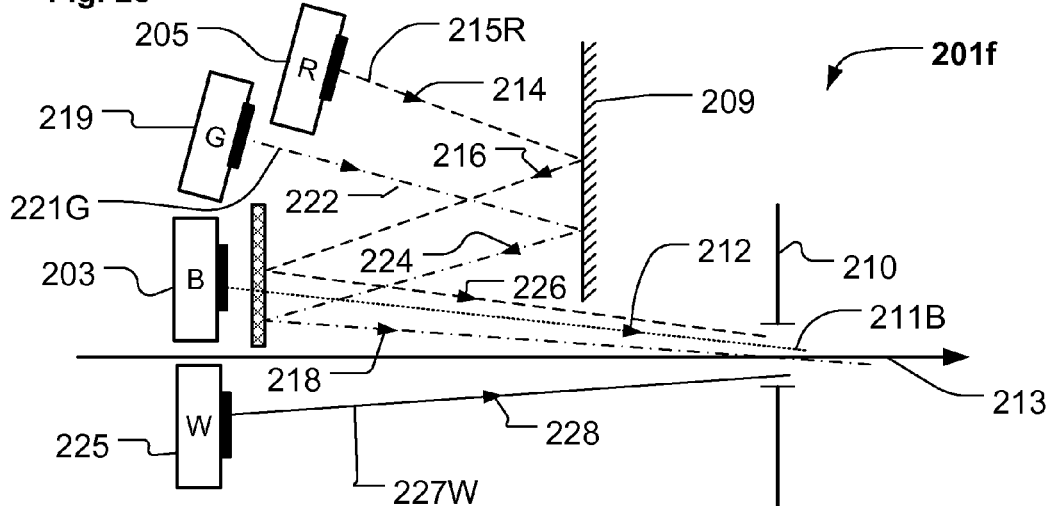

In FIG. 2f the illumination device 201f comprises a fourth light source 225 generating a fourth light beam 227W having a fourth spectral distribution and propagates at primarily in the first direction along the optical axis as illustrated by arrow 228. The fourth spectral distribution is a spectrally broadly distributed white light and labeled with W. In this embodiment the first dichroic reflector 207 is adapted to reflect the second 215R and third 221G light beam and to transmit the first light beam 211B in the same manner as describe above. The fourth light beam 227W propagates primarily in the first direction at and/or near the optical axis 213 and does not hit the first dichroic reflector 207. The fourth white light beam can be used to add brightness to the out coming light beam at the optical gate 213 and further improve the color rendering, as the broad spectral distribution will add the missing spectra components of the first, second and third light beams.

Figure 3:
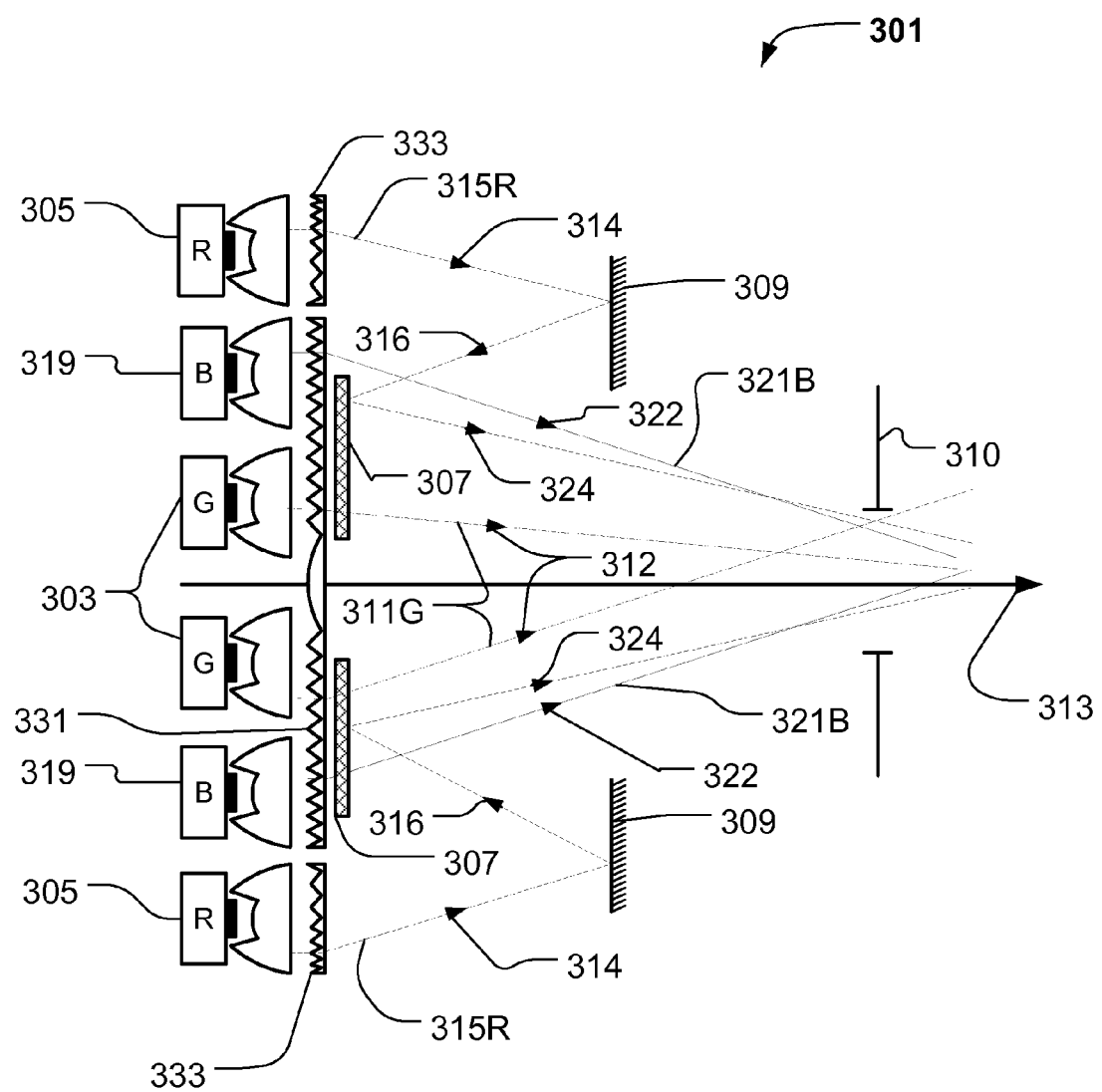
FIG. 3-8 illustrate other embodiments of the illumination device according present invention.

FIG. 3 illustrates another embodiment of an illumination device 301 according to the present invention. The illumination device 301 is a spherical system and FIG. 3 illustrates a cross sectional view. The illumination device comprises a number of first light sources 303 generating first green light beams 311G (illustrated as dashed-dotted lines) having a green spectral distribution. The person skilled in art realizes that a multiple number of green light beams are generated even though that only two green light beams are illustrated. The green light beam 311G propagate primarily in a first direction along the optical axis 313 as illustrated by arrows 312. The illumination device comprises further a number of third light sources 319 generating a blue light beam 321B (illustrated as dotted lines through out this application) having a blue spectral distribution. The person skilled in art realizes that a multiple number of blue light beams are generated even though that only two blue light beams are illustrated. The blue light beams 321B propagate primarily in a first direction along the optical axis 313 as indicated by arrow 322. The first light sources 303 and third light sources are positioned near the optical axes and the first light beam 311G and the second light beam 321B propagates primarily in the first direction at and/or near the optical axis.

The illumination device comprises further a number of second light sources 305 generating red light beams 315R having a red spectral distribution. The person skilled in art realizes that a multiple number of red light beams are generated even though that only two red light beams are illustrated. As described in connection with FIG. 2a-2f the second light beam 315R propagates primarily in the first direction along the optical axis 213 direction as indicated by arrows 314, is reflected by reflecting means 309 and propagates hereafter primarily in a second direction as illustrated by arrows 316 and finally reflected by first dichroic reflector 307 and propagates hereafter primarily in the first direction as illustrated by arrows 324. The second light sources 305 are positioned offset the optical axes and the second light beams 315R propagate initially primarily in the first direction offset the optical axes and propagates finally primarily in the first direction at and/or near the optical axes and is thus combined with the first and third light beams.

This illumination device uses in contrast to the prior art color combining systems only one dichroic filter and is thus more efficient and cost effective, as each color dichroic filter always are associated with loss of intensity and can cause unintended diffractions. The illumination device will further not absorber as much energy and does thus not require as much cooling as the prior art systems. It is further possible to add many lights sources without exceeding the Etendue of an imaging system (not shown) positioned along the optical axis of the optical gate, as the light sources generates light beams of different colors which are combined using the diachronic filter. Another advantageous the fact that the light sources can be positioned very close to the optical axis as the light beams from the second light source are directed towards the first light source array.

The illumination device comprises in the illustrated embodiment first converging means 331 converging the green and blue light beams such that the green and blue light beams are focused at a position along the optical axis. The first converging means 331 are positioned before the dichroic reflector and the blue and green light beams are thus diffracted before they are transmitted through the dichroic reflector. The consequence is that the red light beams are not deflected by the first converging means 331. The red light beams are however deflected by second converging means 333 which are adapted to focus the read light beams at the same position (at the gate) along the optical axis as the green and blue light beams.

The illumination device illustrated in FIG. 3 is a spherical system where the light sources of the first array of light sources are distributed uniformly around the optical axes for instance arranged in a honeycomb patter or in rings. The first (green) and third (blue) light sources are arranged at and/or near the optical axes and the second light (red) sources are arrange offset the optical axes at the outermost positions. The light sources of the shown embodiment are LED mounted on a PCB or directly at a cooling module and the light from the LED are collimated by TIR lenses on top of each light source. The skilled person would realize that other kind of light sources, such as discharge lamps, fluorescent lamp, plasma lamps, OLED, etc. also could be used. The light sources can for instance be a ring formed light source surrounding the optical axis. Also the collimation could be performed by other means than TIR lenses, such as reflectors, Köhler kondensers, fish eye lenses or Fresnel lenses, diffraction grating. The first converging means 331 are in the illustrated embodiment carried out as a Fresnel lens. The Fresnel lens collects the green/blue light into the gate, essentially the focal length of the Fresnel lens should be approx the same as the optical distance from Fresnel to gate. The Fresnel lens can for instance be a micro Fresnel lens molded in polymer. However conventional lenses or other kind of converging means can also be used. The first dichroic reflector 307 is positioned adjacent to the converging lens. The dichroic reflector can for instance be coated onto a Fresnel lens whereby the Fresnel lens and dichroic reflector are integrated together.

The reflecting means can be embodied as a number of mirrors uniformly distributed around the optical axis or as ring shaped mirror. The reflecting means can be embodied both as plane mirrors and as curved mirrors. The plane mirrors will only redirect the light beams whereas the curved mirrors also will diffract the light beam. It if for instance possible to integrate the second converging means and the reflecting means by providing a curved mirror which is adapted. The reelecting means can be constructed by means as known in the art of reflecting optics such as glass mirrors, metal surfaces with and/or without reflective coatings. The reflecting means can also be embodied as dichroic reflectors. The skilled person would realized that different configurations and combinations of colors could be beneficial depending upon LED types and choice of dichroic combiner filters The color of the combined outgoing light beam at the gate can be varied by varying the intensity of the light sources in relation to each other as known in the art, e.g. by varying the current through the LEDs or using PWM techniques.

Figure 4:
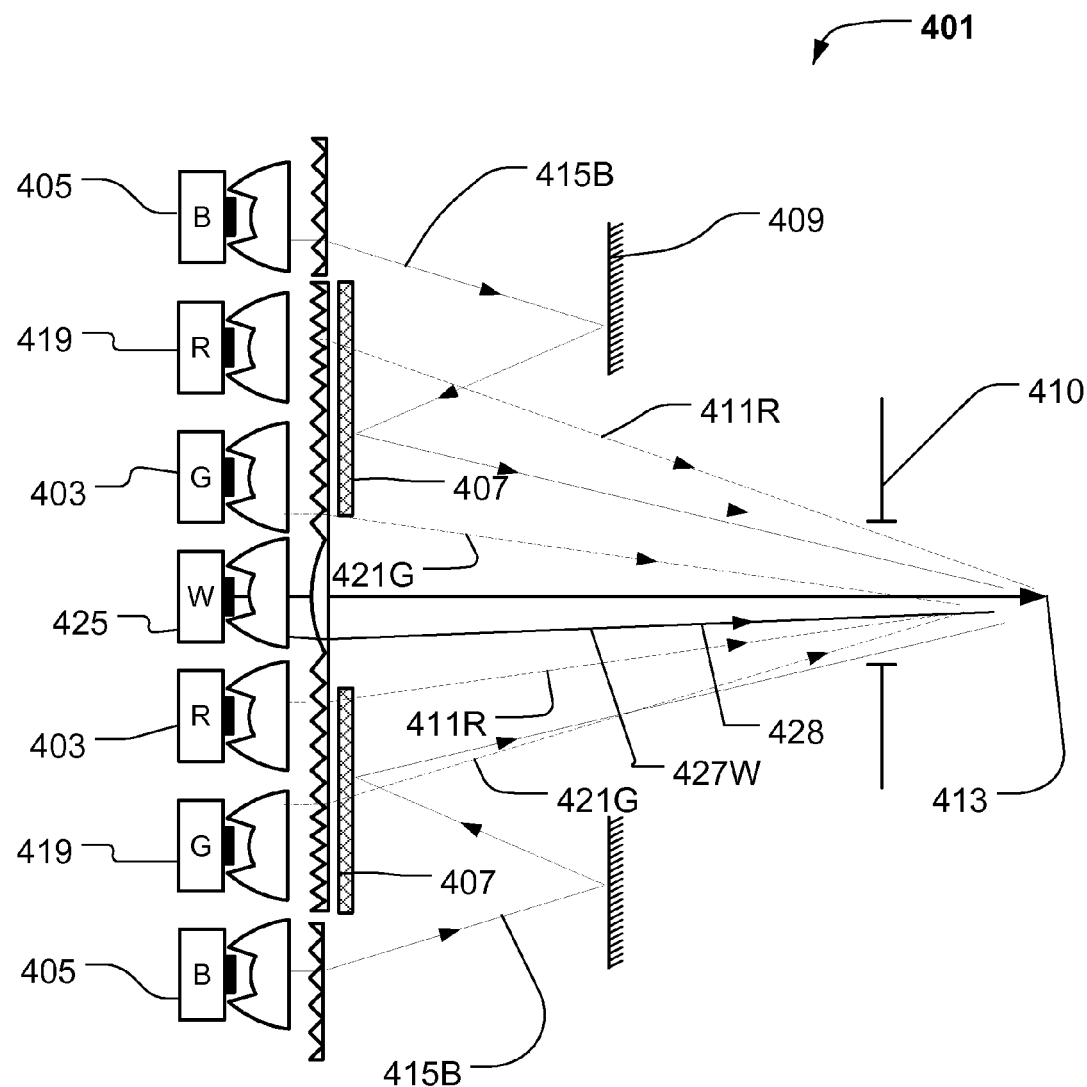

FIG. 4 illustrates another embodiment of the illumination device 401 according to the present invention. The illumination device 401 differs from the illumination device 301 of FIG. 3 in further comprises a fourth light source 425 generating a fourth light beam 427W having a fourth spectral distribution and propagates at primarily in the first direction along the optical axis as illustrated by arrow 428. The fourth spectral distribution is a spectrally broadly distributed white light and labeled with W. The fourth white light beam can be used to add brightness to the out coming light beam at the optical gate 410 and further improve the color rendering, as the broad spectral distribution will add the missing spectra components of the first, second and third light beams. The first and third light sources are further arranged asymmetrical around the optical axes 413 whereby a more uniform color distribution can be achieved at the optical gate.

The number of first 403 and third 419 light sources are respectively embodied as red (R) and green (G) light sources generating first red light beams 411R and third green light beams 421G. The number of second light sources 405 are embodied as blue (B) light sources generating blue light beams 415B. The first dichroic reflector 407 is thus adapted to reflect blue light and transmit green and red light. The illumination device combines the light beams in similar way as the illumination device as described in FIG. 3 with the only difference that the blue light beams are reflected by the reflecting means 409 and the first dichroic reflector and that the red light beam propagated directly towards the optical gate 410. The white light source W is in the illustrated embodiment a white LED; however the skilled person would be able to use other kinds of white light sources such as, discharge lamps, fluorescent lamps, plasma lamps, UV LEDs with phosphor material converting UV light into visible light, halogen etc.

Figure 5:
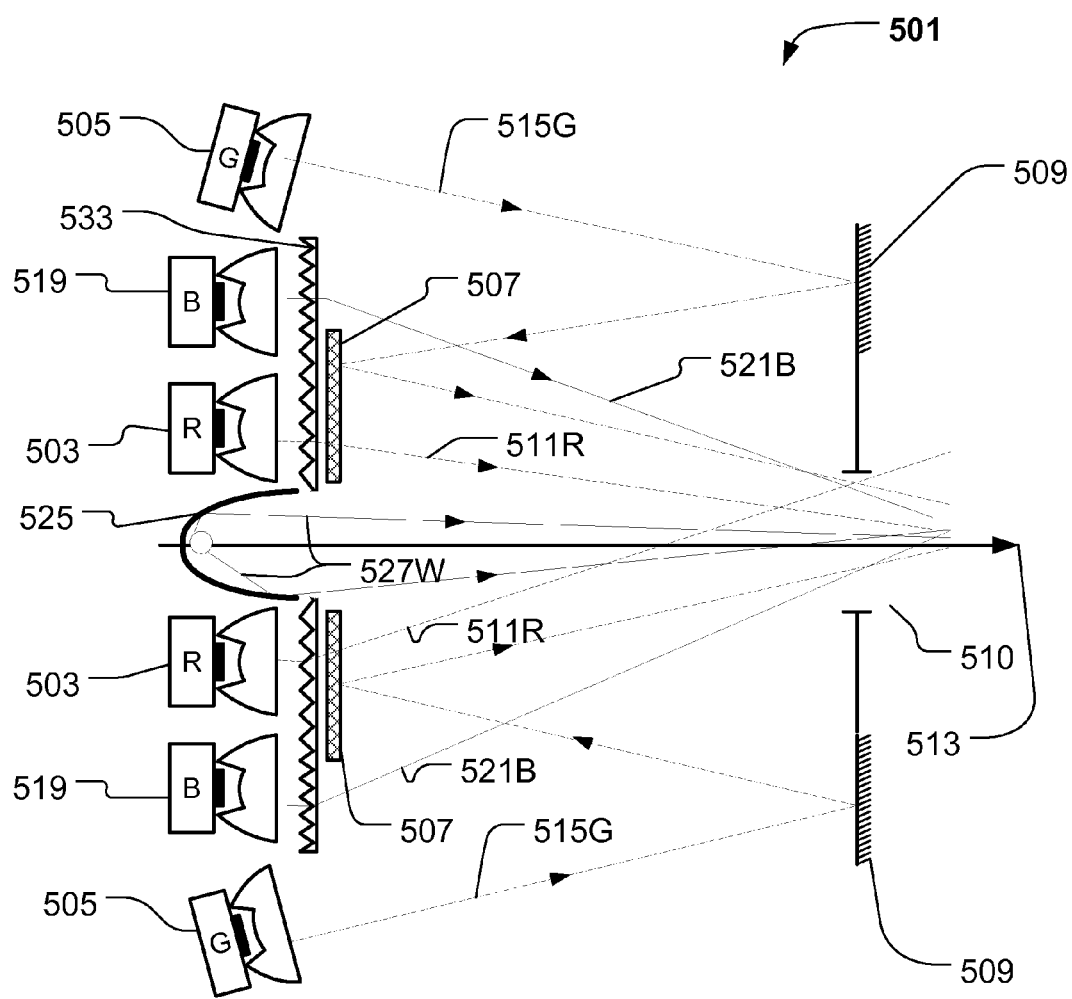

FIG. 5 illustrates another embodiment of the illumination device 501 according to the present invention. The fourth white light source 525 is in this embodiment a discharge or plasma lamp positioned inside a reflector. The middle part of the first converging means has in this embodiment been removed as the reflector is designed to focus the white light beams 527B. It is further illustrated that the number of first 503 and third 519 light sources respectively can be embodied as red (R) and blue (G) light sources generating first red light beams 511R and third blue light beams 521B. The number of second light sources 505 are embodied as green (G) light sources generating green light beams 515G. The first dichroic reflector 507 is thus adapted to reflect green light and transmit blue and red light. The illumination device combines the light beams in similar way as the illumination device as described in FIG. 3 with the difference that the green light beams are reflected by the reflecting means 509 and the first dichroic reflector 507 and that the red light beam propagated directly towards the optical gate 510. FIG. 5 illustrates that the reflection means 509 can be positions further along the optical axis 513. It is in fact possible to arrange the reflecting means at any position downstream the optical axes in relation to the second light sources. The reflection means 509 is in the illustrated embodiment position at the same plane as the optical gate 510. FIG. 5 illustrates also that it is possible to angle the light sources in relation to the optical axes where by the converging means can be omitted. This is illustrated in FIG. 5 by letting the third light source be angled.

Figure 6:
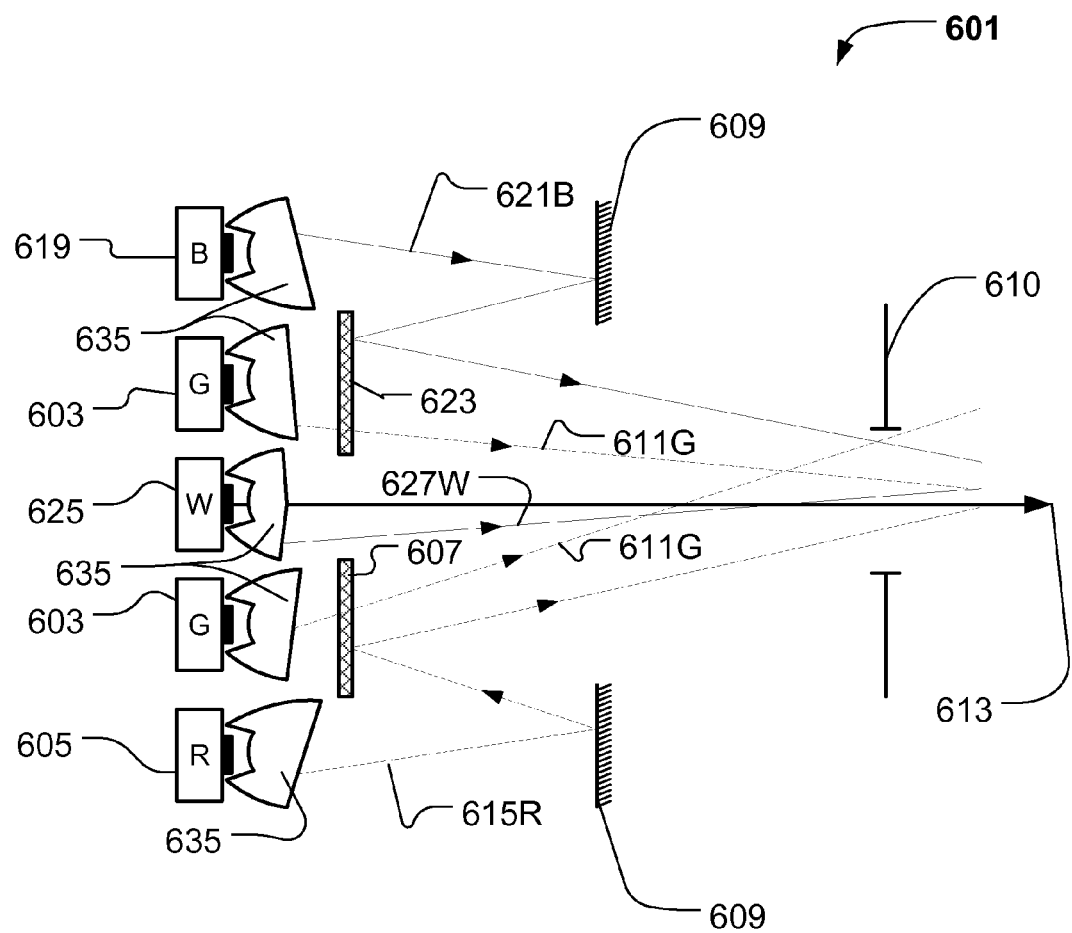

FIG. 6 illustrates another embodiment of the illumination device 601 according to the present invention. The number of first 603, second 605 and third 619 light sources are respectively embodied as green (G), red (R) and blue (B) light sources generating respectively first green light beams 611G, second red light beams (R) 615R and third blue light beams 621B. The green light beams 611G propagates primarily in a first direction along the optical axis 613 towards an optical gate downstream the optical axis. The red 615R and blue 621B light beams are in this embodiment reflected by reflecting means 609 and directed towards dichroic reflectors 607 and 623 respectively. The dichroic reflectors 607 and 623 direct the red and blue light beams primarily on the first direction along the optical axes. A fourth light source 625 generating a fourth light beam 627W having a fourth spectral distribution and propagates at primarily in the first direction along the optical axis.

The converging means are in this embodiment integrated into TIR 635 lenses associated with the light source. TIR lenses can be designed asymmetrically and specifically for each diameter and distance so as to focus light directly into gate. The Fresnel lenses (331 and 333 of FIG. 3) can hereby be omitted where by optical losses can be avoided. Different sizes and shapes of TIR lenses can also be used in order to compensate for differences in radiation pattern of the light sources and optical path length to the gate, and thus be optimized to still achieve a good color mixing. It is further to be noticed that both the red light beams and blue light beams are reflected by the reflecting means 609 and the dichroic reflectors 607 and 623. Dichroic reflector 607 is thus adapted to reflect red light and dichroic reflector 623 is thus adapted to reflect blue light. The amount of green light sources is large than the amount of blue and red light sources due the fact that many LED systems are limited in white output by the output of the green LED's, as the green LED often has less intensity compared to red and blue LEDs. The increased amount of green light sources will thus compensate for this.

Figure 7:
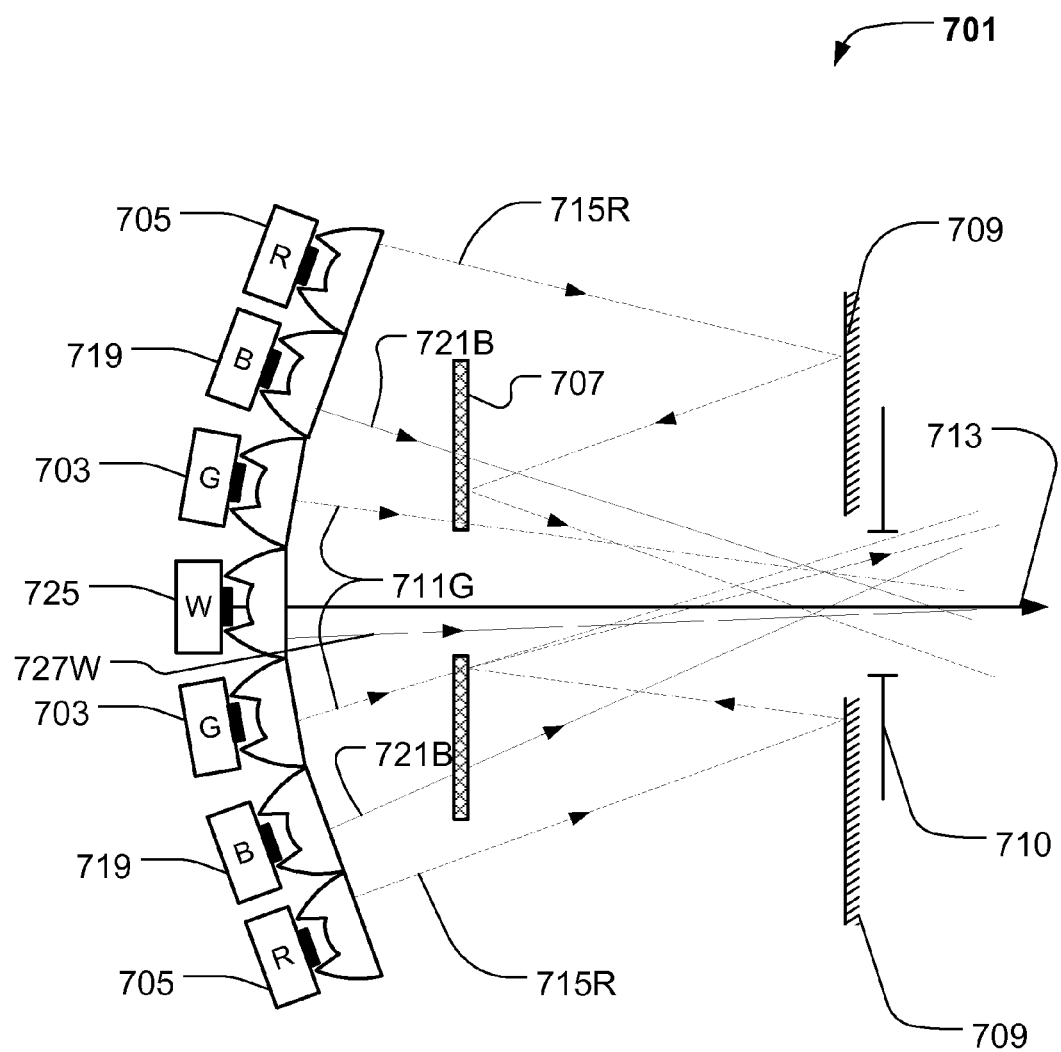

FIG. 7 illustrates another embodiment of the illumination device 701 according to the present invention. The number of first 703, second 705 and third 719 light sources are respectively embodied as green (G), red (R) and blue (B) light sources generating respectively first green light beams 711G, second red light beams (R) 715R and third blue light beams 721B. The green 711B and blue 721B light beams propagates primarily in a first direction along the optical axis 713 towards an optical gate 710 downstream the optical axis. The red 615R light beams are in this embodiment reflected by reflecting means 709 and directed towards dichroic reflectors 707. The dichroic reflectors 707 direct the red light beams primarily in the first direction along the optical axes. A fourth light source 725 generating a fourth light beam 727W having a fourth spectral distribution and propagates at primarily in the first direction along the optical axis. It can be seen that the other light sources are angled in relation to the optical axes in order to focus the light beams a distance along the optical axis.

Figure 8:
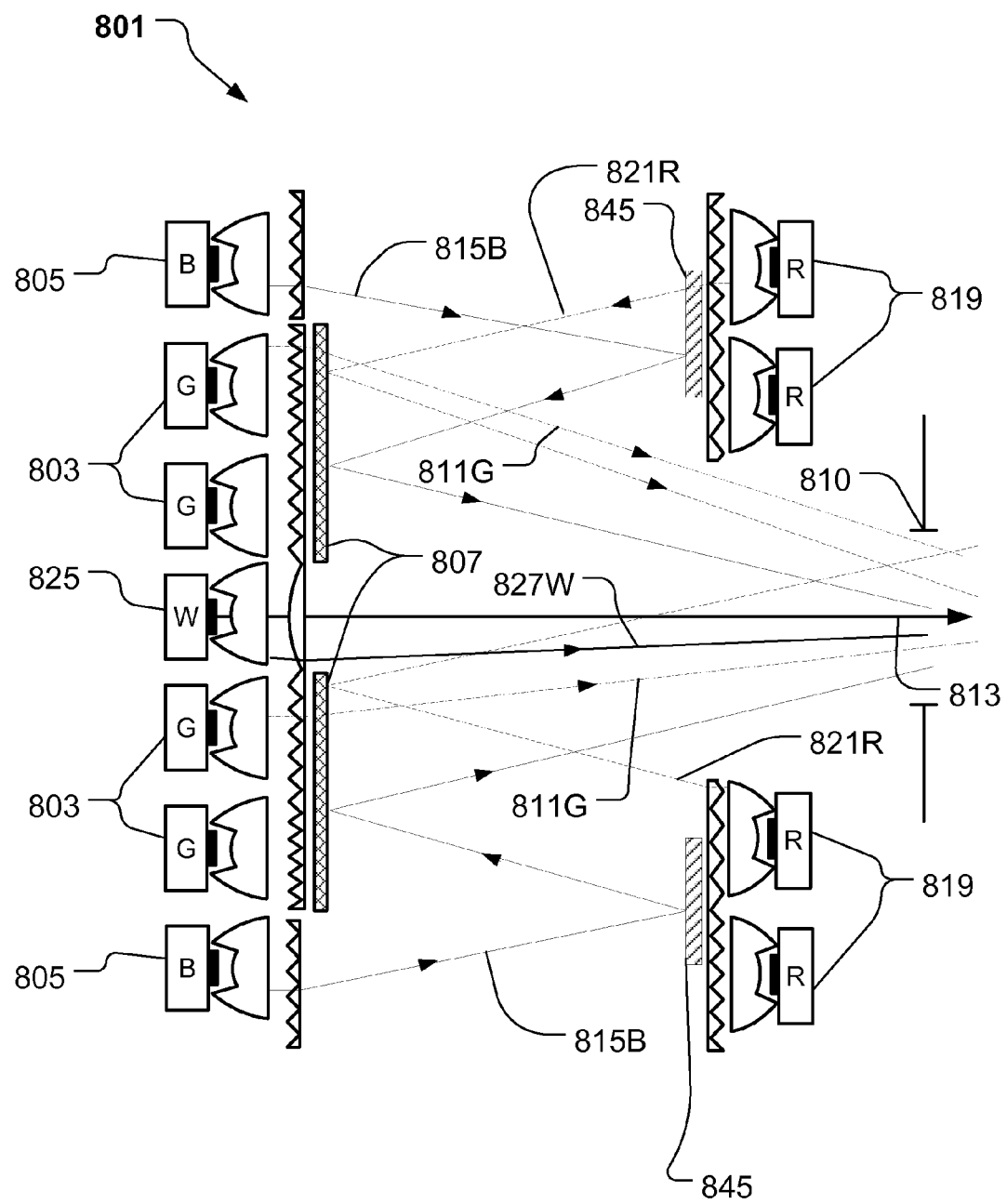

FIG. 8 illustrates another embodiment of the illumination device 801 according to the present invention. The number of first 803, second 805 and third 819 light sources are respectively embodied as green (G), blue (R) and red (B) light sources generating respectively first green light beams 811G, second blue light beams 815B and third red light beams 821R. The green 811B light beams propagate primarily in a first direction along the optical axis 813 towards an optical gate 810 downstream the optical axis. The blue 815B light beams are in this embodiment reflected by reflecting means 845 and directed towards dichroic reflectors 807. The dichroic reflectors 807 direct the blue light beams primarily in the first direction along the optical axes. A fourth light source 825 generating a fourth light beam 827W having a fourth spectral distribution and propagates at primarily in the first direction along the optical axis.

The reflection means 845 is in his embodiment a second dichroic filer 845 adapted to reflect the blue light beams 815B. The second dichroic filter is also adapted to transmit red light beams and the third light sources 819 can thus be arranged behind the reflecting means 845 and the red light beams will initially propagate in the second direction towards the first dichroic filter 807 and thereafter be reflected in the first direction along the optical axis. The first dichroic reflector 807 is thus adapted to reflect both the blue light beams 815B and the red light beams 821R and transmit the green light beam 811G. This embodiment makes it possible to construct a very compact illumination device.

It is to be noted that the illustrated embodiments only serve as illustrating examples of possible solutions and that the person skilled in the art would be able to construct alternative solutions within the scope of the claims. The system can for instance also comprise collimating optics that are different from TIR lens's shown in the figures. For instance as a reflector, Köhler kondenser or different, fish eye lenses, or any combination of these.

The dichroic reflector can be made of smaller pieces glued to plane side of the first converging means (Fresnel lens 315 of FIG. 4), with the coated side towards the gate and by using index matching glue means reducing reflection and losses when light from the first array of light sources passes the converging means and dichroic reflector. The amount of dichroic material can further be reduced by only having dichroic material only at positions where light form the second array of light sources need to be reflected towards the gate. The dichroic reflector can further be optimized for the used wavelengths and the angle of the light incidence on the dichroic reflector. The efficiency of the dichroic reflector is in this way optimized.

The colors of the different light sources at the first and second light source array can be combined in many different ways and identical light sources can also be included at both arrays of light sources. Further examples can for instance be, that the color of the light sources are alternated spherically around the optical axis. Some of the light beams can also experience multiple reflections between the two light source arrays before they are reflected along the optical axis. Such illumination device 801 is illustrated in FIG. 8, where the first light source array 805 comprises blue light sources B which light beam 815B first passes converging means which are adapted to focus the blue light beam approximately at the gate. The blue light 815B is thereafter reflected on a dichroic reflector 845 positioned in front of the second array of light sources. The dichroic reflector 845811b further transmits the red light beams 821R emitted by the red light sources 819R. The blue light beams are then reflected by a dichroic reflector 807 positioned in front of the first light source array and directed along the optical axis. The dichroic reflector 807 is adapted to reflect both the blue and red light beams and further transmits the green light beams 811G.

The light sources can for Etendue limited applications be unencapsulated LED die. This despite the fact that incapsulation of the die with index "matching" material increases extraction efficiency. This because it also increases the Etendue of the sources by the refractive index of the incapsulant raised to the power of 2. For Silecone with a refractive index of approx 1.5 this means that the Etendue of the source is increased by a factor of 2.25 and the number of sources which can be utilized is reduced by the same factor.

Figure 9:
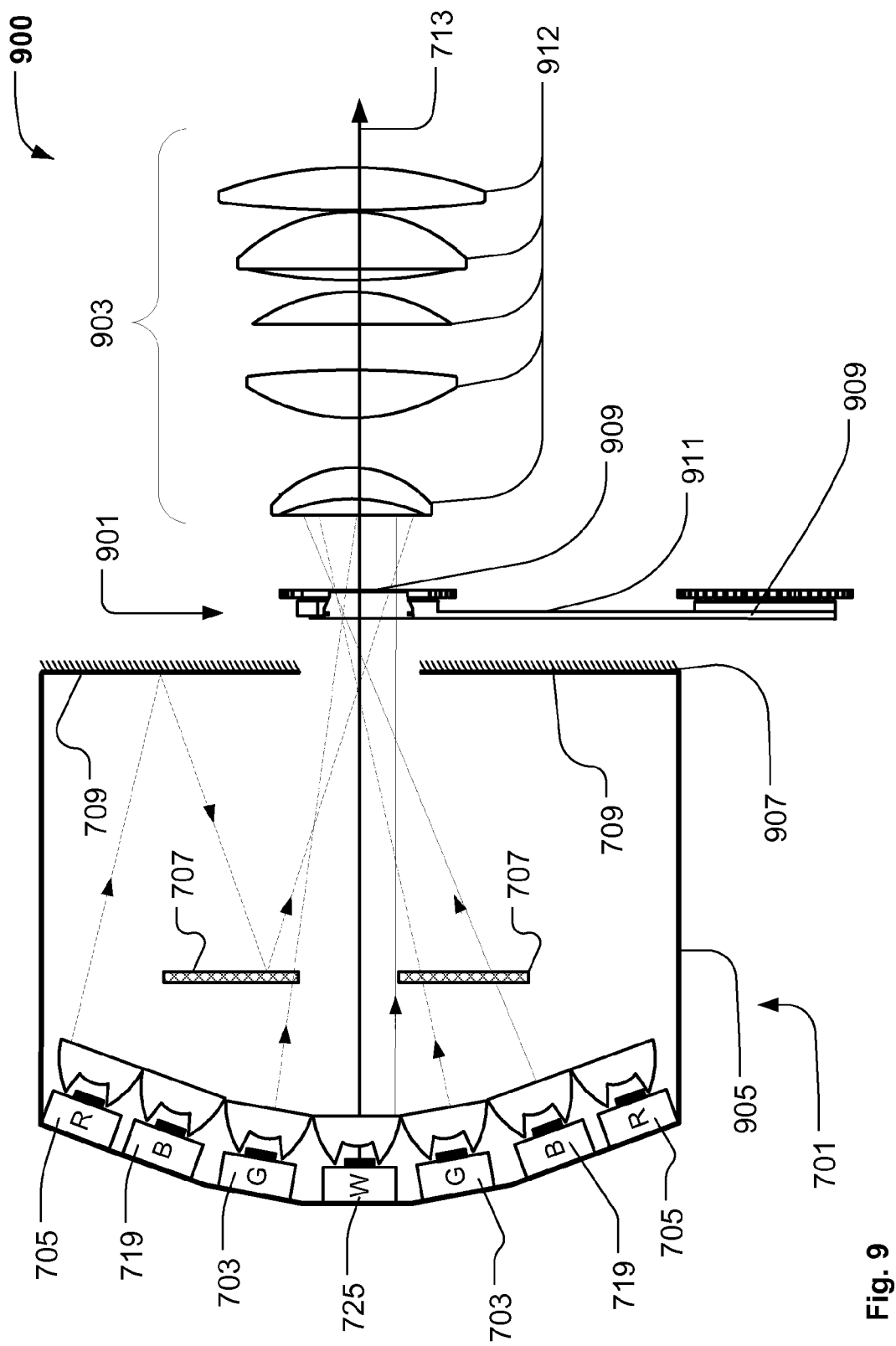
FIG. 9 illustrates an embodiment of imaging device including an illumination device according present invention.

FIG. 9 illustrates a cross sectional view of a projecting illumination device. The projecting illumination device embodied as a GOBO projector 900 adapted to image the GOBO onto a target surface (not shown). The GOBO projector 900 comprises an illumination device 701, a gobo wheel 901 and a projecting system 903.

The illumination device 701 is embodied like the illumination device illustrated in FIG. 7. The skilled person realizes that any of the illumination devices illustrated in FIG. 2-8 and any illumination device falling within the scope of the claims can be used. The illumination device is integrated into a housing 905 and the reflecting means 709 is integrated into the internal side of the front wall 907.

The gobo wheel comprises a number of gobos 909 mounted on a rotating carousel 911 as known in the art of entertainment lighting. The gobo wheel can for instance be embodied as described in U.S. Pat. No. 5,402,326, U.S. Pat. No. 6,601,973, U.S. Pat. No. 6,687,063 or US2009/0122548 incorporated herein by reference. Each gobo can be moved into optical axes 713 and into light beam coming from the illumination device by rotating the carousel. The projecting system comprises a number of optical lenses 912 and is adapted to create an image of the gobo at a target surface (not shown).

The projecting illumination device can also be a digital projector where a digital imaging device such as a DMD, DLP, LCD, LCOS is positioned in the light beam and where the projecting system is adapted to create an image of the digital imaging device at a target surface.

Figure 10:
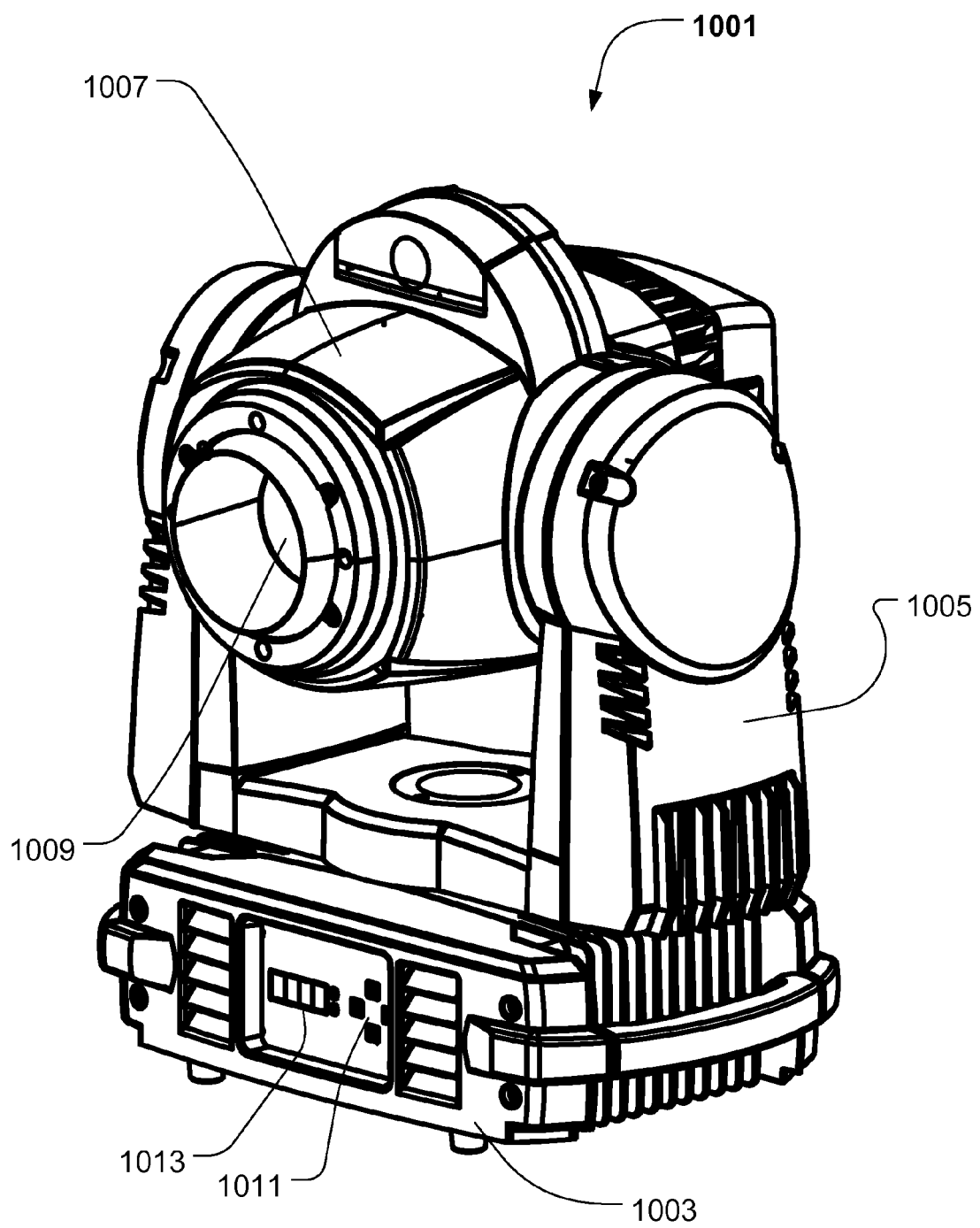
FIG. 10 illustrates a moving head light fixture using the illumination device according to the present invention.

FIG. 10 is a perspective view of moving head light fixture 1001 where a illumination device according to the present invention have been integrated into the head. The moving head lighting fixture 1001 comprises a base 903, a yoke 905 rotatable connected to the base and a head rotatable connected 907 to the yoke. The head comprises an illumination device according to the present invention and generates a light beam (not shown) exiting the head through an exit lens 909. The moving head light fixture comprises first rotating means for rotating the yoke in relation to the base, for instance by rotating a shaft connected to the yoke by using a motor positioned in the base. The moving head light fixture comprises also second rotating means for rotating the head in relation to the yoke, for instance by rotating a shaft connected to the head by using a motor positioned in the yoke. The skilled person would realize that the rotation means could be constructed in many different ways using mechanical components such as motors, shafts, gears, cables, chains, transmission systems etc.

The moving head light fixture receives electrical power from an external power supply. The electrical power is received by an internal power supply which adapts and distributes electrical power through internal power lines to the subsystems of the moving head. The internal power system can be constructed in many different ways. The light fixture comprises also a controller which controls the other components (other subsystems) in the light fixture based on an input signal indicative of at least one light effect parameter and at least one position parameter. The controller receives the input signal from a light controller (nor shown) as known in the art of intelligent and entertainment lighting for instance by using a standard protocol like DMX, ArtNET, RDM etc. The light effect parameter is indicative of at least one light effect parameter of said light beam for instance the amount of dimming and/or the dimming speed of the light beam, a color that a CMY system should mix, the kind of color filter that a color filter system should position in the light beam and/or the kind of gobo that the gobo system should position in the light beam, the divergence of the light beam that light fixture should create using a zoom system, a focus distance that indicate the distance form the lens to a surface where a gobo effect should be imaged, etc.

The controller is adapted to send commands and instructions to the different subsystems of the moving head through internal communication lines. The internal communication system can be based on a various type of communications networks/systems.

The moving head can also have user input means enabling a user to interact directly with the moving head instead of using a light controller to communicate with the moving head. The user input means 911 could for instance be bottoms, joysticks, touch pads, keyboard, mouse etc. The user input means can also be supported by a display 913 enabling the user to interact with the moving head through menu system shown on the display using the user input means. The display device and user input means could in one embodiment also be integrated as a touch screen.

The present invention can for instance be implemented into a projecting device comprising a digital imaging device such as a DMD, DLP, LCD, LCOS or into the head of a moving head light fixture comprising a base, a rotatable yoke connected to the base and a rotatable head connected to the yoke. Hereby a power efficient digital projecting device or a moving head with uniform illumination of the imaging gate and without color artifacts is provided. The projecting system can be incorporated in a moving head light fixture comprising a base, a yoke rotatable connected to said base and a head rotatable connected to the yoke.

The invention claimed is:

1. An illumination device comprising:
   at least a first light source; said first light source generates a first light beam having a first spectral distribution; said first light beam propagates primarily in a first direction along an optical axis;
   at least a second light source, said second light source generates a second light beam having a second spectral distribution; said second light beam propagates primarily in said first direction along said optical axis;
   at least a first dichroic reflector positioned at least partially in said first light beam and said second light beam; said first dichroic reflector transmits at least a part of said first light beam and reflects at least a part of said second light beam;
   reflecting means reflecting at least a part of said second light beam towards said first dichroic reflector;
   wherein said first light source, said reflecting means, said second light source and said first dichroic reflector are mutually arranged such that said second light beam propagates primarily in a second direction substantially opposite said first direction and towards at least a part of said first light source after being reflected by said reflecting means and such that at least a part of said second light beam propagates primarily in said first direction after being reflected by said first dichroic reflector.

2. The illumination device according to claim 1 wherein said second light sources are distributed uniformly around said optical axis.

3. The illumination device according to claim 1 wherein a number of said second light sources are spherical distributed around said optical axis.

4. The illumination device according to claim 1 wherein said reflecting means are arranged at a distance along said optical axis.

5. The illumination device according to claim 4 wherein a number of said reflecting means are arranged uniformly around said optical axis.

6. The illumination device according to claim 4 wherein said light beams pass through an aperture in said reflecting means.

7. The illumination device according to claim 4 wherein said optical axis passes through an aperture in said reflecting means.

8. The illumination device according to claim 1 further comprising at least a third light source generating a third light beam having a third spectral distribution and propagating primarily in said first direction along said optical axis.

9. The illumination device according to claim 8 wherein said first dichroic reflector transmits at least a part of said third light beam, and that said third light source, said reflecting means, said second light source and said first dichroic reflector being mutually arranged such that said second light beam propagates primarily in a second direction substantially opposite said first direction and towards at least a part of said third light source after being reflected by said reflecting means, and such that at least a part of said second light beam propagates primarily in said first direction after being reflected by said first dichroic reflector.

10. The illumination device according to claim 8 further comprising at least a second dichroic reflector positioned at least partially in said third light beam and said second light beam, said second dichroic reflector transmits at least a part of said third light beam and reflects at least a part of said second light source and in that said third light source, said reflecting means, said second light source and said second dichroic reflector being mutually arranged such that said second light beam propagates primarily in a second direction substantially opposite said first direction and towards at least a part of said third light source and at least a part of said second dichroic reflector after being reflected by said reflecting means and such that that at least a part of said second light beam propagates primarily in said first direction after being reflected by said second dichroic reflector.

11. The illumination device according to claim 8 wherein said first dichroic reflector reflects at least a part of said third light beam and said reflecting means reflecting at least a part of said third light beam towards said first dichroic reflector and in that said first light source, said reflecting means, said at third light source and said first dichroic reflector being mutually arranged such that said third light beam propagates primarily in said second direction substantially opposite said first direction and towards at least a part of said first light source after being reflected by said reflecting means and such that that at least a part of said third light beam propagates primarily in said first direction after being reflected by said first dichroic reflector.

12. The illumination device according to claim 8 further comprising at least a second dichroic reflector positioned at least partially in said first light beam and said third light beam and said reflecting means reflecting at least a part of said third light beam towards said second dichroic reflector, said second dichroic reflector transmits at least a part of said first light beam and reflects at least a part of said third light source and in that said first light source, said reflecting means, said at third light source and said second dichroic reflector being mutually arranged such that said third light beam propagates primarily in said second direction substantially opposite said first direction and towards at least a part of said first light source after being reflected by said reflecting means and such that at least a part of said third light beam propagates primarily in said first direction after being reflected by said second dichroic reflector.

13. The illumination device according to claim 1 further comprising at least a fourth light source generating a fourth light beam having a fourth spectral distribution, said fourth light beam propagates primarily in said first direction and that said fourth spectral distribution being a spectrally broadly distributed white light.

14. The illumination device according to claim 1 wherein at least one of said dichroic reflectors is substantially perpendicular to said first direction.

15. A projecting device comprising a
    digital imaging device;
    an imaging system, adapted to image said digital imaging device at a surface,
    characterized in comprising an illumination device according to claim 1, wherein said illumination device illuminates least a part of said digital imaging device.

16. A moving head light fixture comprising:
    a base,
    a yoke rotatably connected to said base,
    a head rotatably connected to said yoke,
    characterized in that said head comprises an illumination device according claim 1.

17. The moving head light fixture according to claim 16 further comprising a beam shaping device and a imaging system adapted to image said beam shaping device at a surface, where said illumination device illuminates at least a part of said beam shaping device.

18. A method of illumination, the method comprising the steps of:
- generating a first light beam having a first spectral distribution;
- directing said first light beam primarily in a first direction along an optical axis;
- transmitting at least a part of said first light beam through a dichroic reflector;
- generating a second light beam having a second spectral distribution;
- directing said second light beam primarily in said first direction along an optical axis;
- directing said second light beam towards said dichroic reflector using reflection means and thereafter
- directing said second light beam primarily in said first direction using said dichroic reflector;
- wherein said step of directing said second light beam towards said dichroic reflector using reflection means comprises the step of directing said second light beam primarily in a second direction substantially opposite to said first direction and towards said light source generating said first light beam.

* * * * *